United States Patent

[11] 3,584,275

[72] Inventor Nathan Paulson
New London, Conn.
[21] Appl. No. 812,231
[22] Filed Apr. 1, 1969
[45] Patented June 8, 1971
[73] Assignee Walter Kidde & Company, Inc.
Belleville, N.J.

[54] FREQUENCY RESPONSIVE SWITCHING CIRCUIT
3 Claims, 1 Drawing Fig.

[52] U.S. Cl. .......... 317/147, 330/109, 317/148.5
[51] Int. Cl. .......... H01h 47/20
[50] Field of Search .......... 330/109; 317/147

[56] References Cited

UNITED STATES PATENTS

| | | | |
|---|---|---|---|
| 3,207,959 | 9/1965 | Miller .......... | 317/147 |
| 3,405,368 | 10/1968 | Howe .......... | 330/109X |
| 3,463,928 | 8/1969 | Murphy .......... | 330/109X |

*Primary Examiner*—Lee T. Hix
*Attorney*—Darby and Darby

ABSTRACT: A solid state switching circuit responsive only to an input signal of a preselected single frequency including a degenerative feed back network for suppressing all input signals having frequencies other than the preselected frequency to prevent actuation of the circuit in response to the other frequency signals.

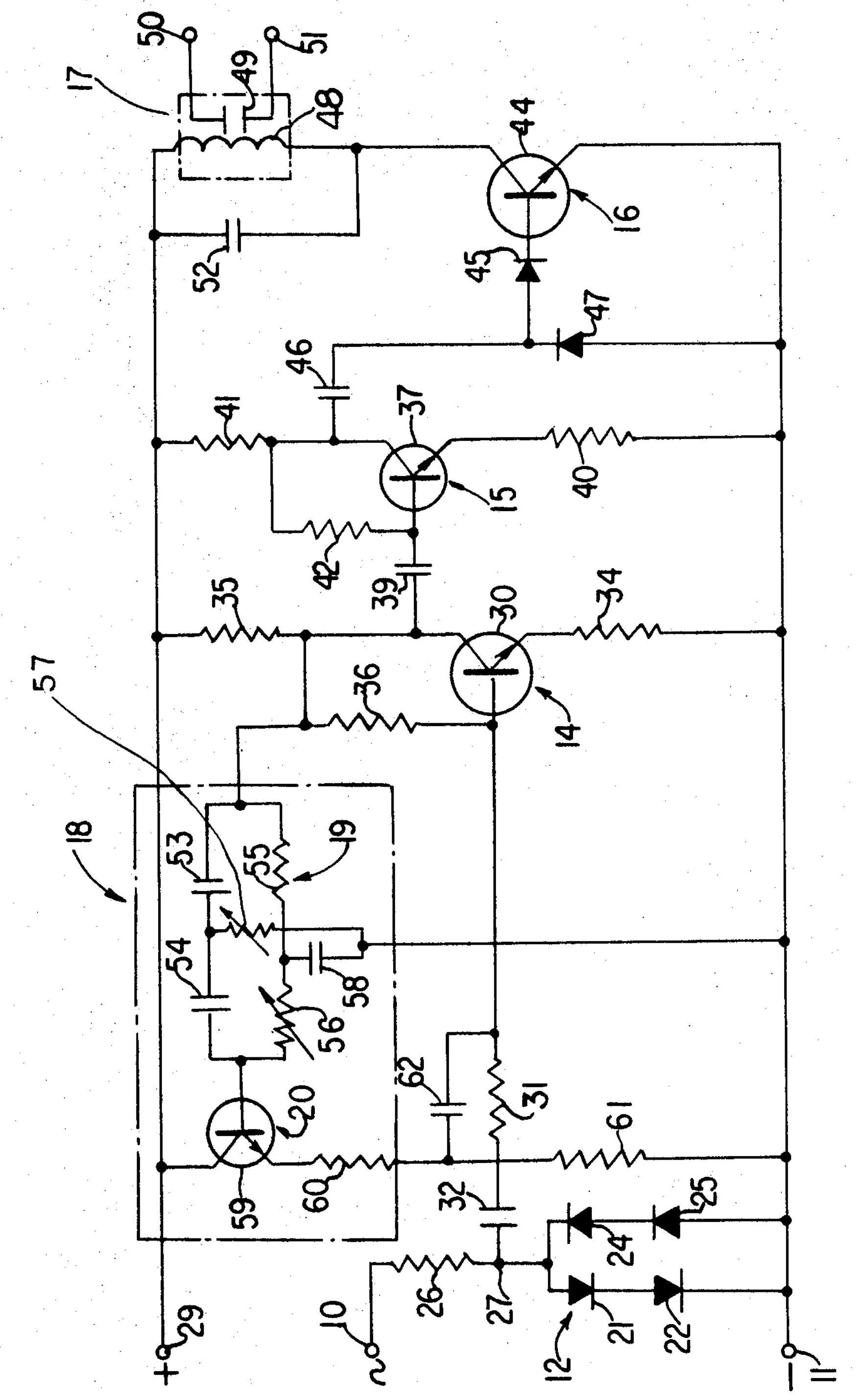
INVENTOR
NATHAN PAULSON
BY
AGENT

FREQUENCY RESPONSIVE SWITCHING CIRCUIT

BACKGROUND OF THE INVENTION

The present invention relates to frequency responsive switches and more particularly to such switches which are adjustable so that any one of a range of frequencies may be selected.

In the past, frequency responsive switches have been of two general types, a mechanical type utilizing a resonant reed and an electrical type using a complex LC resonant filter. In the mechanical type the reed must be dimensioned to have a natural frequency corresponding to the desired actuating frequency, and therefore these devices are not adjustable after manufacture. The devices using the LC filters are adjustable, however, where a high degree of accuracy is required these filters become very complex, bulky and expensive.

SUMMARY

Accordingly it is an object of the present invention to provide a simple, compact, inexpensive, and highly accurate frequency responsive switching apparatus.

Another object is to provide such apparatus which is adjustable to any desired frequency within a wide range of frequencies.

According to the present invention the foregoing objects are accomplished by providing a switching circuit responsive only to an input signal of a preselected frequency comprising in combination, input terminals for receiving preselected frequency signals and other frequency signals, means connected to the input terminals for limiting the magnitude of all received signals, first amplifying means connected to the output of the limiting means, second amplifying means connected to the output of the first amplifying means, a pair of output terminals, switching means under the control of the second amplifying means for interconnecting the output terminals to close an external circuit connected thereto, a degenerative feed back circuit connected between the output of the first amplifying means and the input of the first amplifying means for feeding back only the other frequency signals to the first amplifying means input in out of phase relationship with the other frequency signals received at the input terminals so that all received signals other than the preselected frequency are effectively canceled.

A preferred embodiment of the invention has been chosen for purposes of illustration and description, and is shown in the accompanying drawings, forming a part of the specification, wherein:

The single FIGURE of the drawing is a schematic diagram of the circuit of the present invention.

Referring to the drawing in detail there is shown a frequency responsive switching circuit according to the present invention which includes input terminals 10 and 11, a limiting network 12, a first transistor amplifier stage 14, a second transistor amplifier stage 15, a transistor switch stage 16, a reed relay 17, and a feed back network 18 including a filter 19 and an emitter follower transistor stage 20.

The limiting network 12 includes a pair of diodes 21 and 22 connected in series and a pair of oppositely poled diodes 24 and 25 also connected in series. The two series diode circuits are connected in parallel and the resulting parallel circuit is connected in series with a resistor 26 between the inputs terminals 10 and 11. The diodes 21 and 22 conduct when terminal 10 is more positive than terminal 11 and the diodes 24 and 25 conduct on reverse polarity. Each of the diodes has a threshold value of approximately 0.5 volts and therefore the voltage at the junction of the resistor 26 and the parallel diode circuit 12 (point 27) is limited to approximately 1 volt.

The switching circuit is powered by a DC supply connected between a positive terminal 29 and the terminal 11.

The amplifier stage 14 includes a transistor 30 having a base connected to the junction 27 through a resistor 31 and a capacitor 32, an emitter connected to the terminal 11 through a resistor 34, and a collector connected to the terminal 29 through a resistor 35. A resistor 36 is connected between the base and the collector of transistor 30.

The amplifier stage 15 includes a transistor 37 having a base connected to the collector of transistor 30 through a capacitor 39, an emitter connected to the terminal 11 through a resistor 40, and a collector connected to the terminal 29 through a resistor 41. A resistor 42 is connected between the base and collector of the transistor 37.

The switching stage 16 includes a power transistor 44 having a base connected to the collector of the transistor 37 through a diode 45 and a capacitor 46, an emitter connected directly to the terminal 11, and a collector. A diode 47 is connected between the terminal 11 and the junction of the diode 45 and the capacitor 46.

The red relay 17 includes a coil 48 connected between the terminal 29 and the collector of the transistor 44, and a pair of contacts 49 connected between output terminals 50 and 51. A capacitor 52 is connected across the coil 48.

The filter 19 of the network 18 is of a "twin T" configuration and includes a pair of capacitors 53 and 54 connected in series, and a fixed resistor 55 connected in series with a variable resistor 56. These two series circuits are connected in parallel between the collector of transistor 30 and the emitter follower stage 20. A variable resistor 57 is connected between the terminal 11 and the junction of capacitors 53 and 54, and a capacitor 58 is connected between the terminal 11 and the junction of the resistors 55 and 56.

The emitter follower stage 20 includes a transistor 59 having a base connected to the output of the filter 19, an emitter connected to the terminal 11 through series connected resistors 60 and 61, and a collector connected directly to the terminal 29. A coupling capacitor 62 connects the base of transistor 30 to the junction of resistors 60 and 61.

In operation, the input signals present at the terminals 10 and 11 are limited by the limiter 12 and amplified by the transistor 30. The amplified signals appearing at the collector of the transistor 30 are 180° out of phase with the signals applied to the base thereof. These signals are passed through the "twin T" filter 19 and are applied to the base of the transistor 59. The "twin T" filter is adjusted by means of resistors 56 and 57 to pass all frequencies except the preselected frequency to which the switching circuit is to respond.

The output of the filter 19 is passed through the emitter follower stage 20 and is applied to the base of the transistor 30 to effectively cancel out, in the following manner, all signals except those of the preselected frequency.

The output signals of the filter 19 were amplified and shifted in phase 180° by the amplifier stage 14. The emitter follower stage 20 reduces the amplitude of these signals, without altering their phase, such that the signals fed back to the base of transistor 30 effectively cancel out the input signals of the same frequencies.

The preselected frequency, which is not canceled by the feed back signals, is further amplified by the stage 15 and is then rectified by the diodes 45 and 47 and applied to the base of the transistor 44. If this signal is large enough to overcome the threshold value of the diode 45, the transistor 44 conducts. Current then flows through the winding 48 of the reed relay 17 closing the contacts 49 to complete any external circuit connected between the terminals 50 and 51.

Units actually constructed in accordance with the foregoing description have been found to be extremely accurate and compact, and capable of being preset to respond to any frequency within a wide range of frequencies. A typical frequency range for a single unit is from 25 Hz. to 100 Hz. The unit may be preset to any frequency within this range and will not respond to any signal having a frequency which is more than 5 percent above or below the selected frequency. Each unit is packaged within a container measuring 1.5 inches by 1.5 inches x 2.75 inches.

It will be seen from the foregoing description, that the present invention provides a simple, compact, inexpensive, and highly accurate frequency responsive switching apparatus which is adjustable to any desired frequency within a wide range of frequencies.

I claim:

1. A switching circuit responsive only to an input signal of a preselected frequency comprising in combination, input terminals for receiving preselected frequency signals and other freqUency signals, means connected to said input terminals for limiting the magnitude of all received signals, first amplifying means connected to the output of said limiting means, second amplifying means connected to the output of said first amplifying means, relay switching means connected to and operated by said second amplifying means, and a degenerative feed back circuit connected between the output of said first amplifying means and the input of the first amplifying means for feeding back only said other frequency signals to said first amplifying means input in out of phase relationship with said other frequency signals received at said input terminals so that all received signals other than said preselected frequency are effectively canceled, said degenerative feed back circuit including a filter circuit for passing only said other frequency signals received from said first amplifying means and an emitter follower circuit connected to the output of said filter circuit to substantially match the amplitude of the other frequency feed back signals to that of the other frequency input signals, said signal of said preselected frequency being amplified by said second amplifying means to operate said relay switching means.

2. A circuit according to claim 1 wherein said filter circuit is of the "twin T" configuration.

3. A circuit according to claim 2 wherein said "twin T" filter includes resistor and capacitors, some of which are adjustable to vary the filter characteristics.